United States Patent Office.

WILLIAM BARKERVILL HAMILTON, OF NEW ORLEANS, LOUISIANA, ASSIGNOR TO THE NEW ORLEANS SANITARY AND FERTILIZING COMPANY.

Letters Patent No. 114,133, dated April 25, 1871.

IMPROVEMENT IN FERTILIZING COMPOUNDS.

The Schedule referred to in these Letters Patent and making part of the same.

*To all whom it may concern:*

Be it known that I, WILLIAM BARKERVILL HAMILTON, of New Orleans, in the parish of Orleans and State of Louisiana, have invented a new and useful Fertilizing Compound, which I call the "Pelican fertilizer;" and I do hereby declare that the following is a full, clear, and exact description of the same.

The nature of my invention consists in producing a fertilizing compound by the admixture of the following substances or ingredients, viz., night-soil, cotton-seed meal, salt, gypsum, and bone phosphate.

To enable others skilled in the art to properly prepare and mix the several ingredients in order to produce such compound as I contemplate using, I will now proceed to describe the same.

The night-soil is concentrated and deodorized by the use of charcoal in the ordinary manner.

The cotton-seed meal may be used as it comes from the mill, but I prefer to use it from the cake after it has been pressed into that form.

The bone phosphate I use in a soluble state, and usually prepared in large quantities or proportions.

The salt and gypsum are used in their ordinary form.

These ingredients are thoroughly mixed in a suitable vessel or other receptacle in about the following proportions:

Night-soil, prepared as stated, four-twelfths; cotton-seed meal, prepared as stated, four-twelfths; salt and gypsum, in about equal proportions, two-twelfths; bone phosphate, in a soluble state, two-twelfths.

I desire it to be understood, however, that, while practical experience has fully attested the fact that the compound when made according to the foregoing formula produces a most effective fertilizer, still these proportions are not deemed arbitrary, but can readily be altered and changed, as under many circumstances the same may be considered desirable.

Having thus fully described my invention,

What I claim therein as new, and desire to secure by Letters Patent of the United States, is—

A fertilizing compound composed of the ingredients stated.

In testimony whereof I have signed my name to this specification in the presence of two subscribing witnesses.

WILLIAM BARKERVILL HAMILTON.

Witnesses:
    E. H. MURFEE,
    J. O. SALAIM.